United States Patent [19]
Wilson

[11] Patent Number: 5,265,769
[45] Date of Patent: Nov. 30, 1993

[54] DRINKING APPARATUS

[76] Inventor: Danny G. Wilson, 8565 Park La. Apt. 1802, Dallas, Tex.

[21] Appl. No.: 905,736

[22] Filed: Jun. 29, 1992

[51] Int. Cl.[5] .............................................. A45C 1/04
[52] U.S. Cl. .................................... 222/175; 222/610
[58] Field of Search ............... 222/610, 175, 608, 609, 222/185, 129; 224/30 R, 32 R, 252, 148; 280/288.4

[56] References Cited

U.S. PATENT DOCUMENTS

| | | | |
|---|---|---|---|
| 4,095,812 | 6/1978 | Lowe | 280/289 |
| 4,139,130 | 2/1979 | Glusker et al. | 222/175 |
| 4,274,566 | 6/1981 | Rowe | 222/610 |
| 4,356,927 | 11/1982 | Cooper et al. | 220/90.2 |
| 4,684,032 | 8/1987 | Tsay | 215/1 A |
| 4,735,329 | 4/1988 | Le | 215/229 |
| 4,807,813 | 2/1989 | Coleman | 222/175 |
| 4,852,781 | 8/1989 | Shumick et al. | 224/148 |
| 4,976,364 | 12/1990 | Solomon | 215/229 |
| 5,029,719 | 7/1991 | Solomon | 215/229 |
| 5,048,705 | 9/1991 | Lynd et al. | 215/1 A |

*Primary Examiner*—Edwin L. Swinehart
*Attorney, Agent, or Firm*—Vinson & Elkins

[57] ABSTRACT

A drinking apparatus is described for use in any activity where a person desires to have easy access to a drink. The drinking apparatus includes a bottle for storing a fluid and a tube accessible by the mouth of a user to apply suction for drinking from the bottle. A flow control device is provided in communication with the tube so that once suction is applied, fluid may flow from the bottle toward the point of suction, but cannot flow in the opposite direction back into the bottle.

17 Claims, 1 Drawing Sheet

DRINKING APPARATUS

TECHNICAL FIELD OF THE INVENTION

This invention relates in general to drinking apparatus, and more particularly to an improved drinking apparatus that a user may drink from with little or no hand interaction.

BACKGROUND OF THE INVENTION

In many outdoor activities, it has been recognized that either participants or spectators often wish to have accessibility to some type of drinking apparatus. Typically, the type of activity involved, and the demands on the participant or spectator, dictate the specific needs and desires relating to the drinking apparatus. For example, in distance running or bicycling events, it is common for an athlete to carry some type of drinking reservoir so that periodically the athlete may take a drink. Indeed, in many lengthy competitive activities, it is imperative that the participant have access to fluid to replenish body fluids otherwise lost during the activity.

As a specific example, in distance bicycling events, it is common and well known in the art for each bicycle to be mounted with one or more drinking bottle cages, each capable of holding a drinking bottle somewhere along the frame of the bicycle. When the cyclist becomes thirsty, he or she may reach down and withdraw the bottle from its respective cage, take a drink from the bottle, and return it to its cage. While this approach permits the cyclist access to a desirable fluid, it has numerous disadvantages. One disadvantage is the physical manipulation required for the cyclist to withdraw the bottle from its cage. In particular, often the bottle is mounted somewhere below the seat of the bicycle and, as a result, the cyclist is forced to bend in an uncomfortable and unsafe position to reach the bottle. Thus, in addition to providing discomfort to the cyclist, he or she is put in an awkward and unsafe position which could cause the bicycle to become unstable and fall. Still further, the drinking activity is distracting to the cyclist, which is therefore both unsafe and time consuming. Moreover, in withdrawing and replacing the bottle into its respective cage, the cyclist may drop the bottle along the path of travel, thereby forcing the cyclist either to expend valuable time in retrieving the bottle or continuing his or her travels with no further access to a drink. Still further, a dropped bottle poses a safety hazard to cyclists behind the rider who dropped his or her bottle. Indeed, many bicycle accidents have occurred where trailing riders ran over a dropped bottle, thereby causing them to lose their balance and fall to the ground.

U.S. Pat. No. 4,095,812, issued to Rowe on Jun. 20, 1978 (the '812 patent). The '812 patent illustrates a bicycling drinking apparatus which attempts to solve some of the problems described above. Specifically, the bicycle drinking apparatus includes a water bottle having a flexible tube which extends from the bottle to a position proximate the cyclist's mouth. The tube is further wound through a reel-type device which allows the cyclist to extend the tube to his or her mouth for sucking fluid from the bottle and, thereafter, reeling the tube back to a retracted position such that it is no longer accessible to the cyclist's mouth. Thus, this system prevents the cyclist from having to withdraw and replace the fluid bottle into its cage each time the cyclist desires to take a drink.

While easing the burden of having to manipulate the bottle, however, the system of the '812 patent includes several disadvantages. One disadvantage is that the cyclist is still required to conduct detailed physical manipulations to withdraw and retract the drinking tube each time a drink is taken. As a result, again the concentration of the cyclist is taken off the immediate challenge of operating the bicycle and placed instead on the task of taking a drink. Again, therefore, valuable time and safety is compromised at the expense of providing a drink to the cyclist.

Yet another and, perhaps, more significant disadvantage with the system in the '812 patent is the amount of suction demanded in order to bring fluid to the operator's mouth. Specifically, each time an operator of the Rowe system wishes to take a drink, he or she must apply a sufficient amount of suction to draw fluid from the bottle, through the entire length of the tube, to the mouth of the operator. As a result, it should be appreciated that a great deal of suction strength is likely exhausted each time a drink is taken. Naturally, over a repeated number of drinks, this activity could exhaust the cyclist. Indeed, during an aerobic exercise activity, such as a lengthy race under extreme conditions, this additional need to repeatedly apply suction to the tube could be dangerously tiring and could interfere with the normal breathing activity of the cyclist.

Another prior art approach to some of the above-referenced problems has been to provide a pressurized fluid bottle having a tube extending toward the user's mouth. A valve is disposed at the end of the pressurized tube so that the operator may actuate the valve with his or her teeth. More specifically, when the operator wishes to take a drink, he or she bites onto the valve, thereby permitting the pressurized water to pass through the valve and into the operator's mouth. While this system avoids the suction problems associated with the Rowe system described above, it is necessarily mechanically complex. In addition, its complexity requires that the ultimate device be relatively expensive and, therefore, its cost may be prohibitive to casual bicycle riders or joggers. An additional drawback of this system may arise from a failure in the pressurization mechanism. Specifically, if this pressurization system should fail, the system is rendered useless to the operator and, therefore, the operator is left with no fluid to drink. Thus, if the system is being used in a long-distance bicycle race or the like, its failure could be critical as it may leave the operator with no fluid for the duration of the race.

It is therefore an object of the present invention to provide a drinking apparatus which is capable of storing a desired amount of fluid, and providing an operator access to the fluid when desired.

It is a further object of the present invention to provide a drinking apparatus which provides access to the fluid stored within the drinking apparatus with little or no hand manipulation required by the user.

It is yet another object of the present invention to provide a drinking apparatus which provides access to the fluid stored within the drinking apparatus while requiring a minimal amount of suction.

It is yet another object of the present invention to provide a minimal amount of complexity to the system, thereby reducing the possibility of system failure and cost.

Still further objects and advantages of the present invention will be apparent to those of ordinary skill in the art having reference to the following specification together with its drawings.

SUMMARY OF THE INVENTION

In accordance with the present invention, an improved drinking apparatus is provided which substantially reduces the disadvantages and problems associated with prior drinking apparatus, and seeks to further the objects set forth above.

The present invention includes an apparatus for drinking a liquid stored in a bottle. Specifically, the apparatus includes a tube for drawing liquid in a first direction from the bottle toward a point external from the bottle in response to suction at that point. In addition, the apparatus includes means communicating with the tube for preventing the fluid from moving in a second direction opposite the first direction. The means communicating with the tube permits the fluid to move in the first direction in response to suction.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
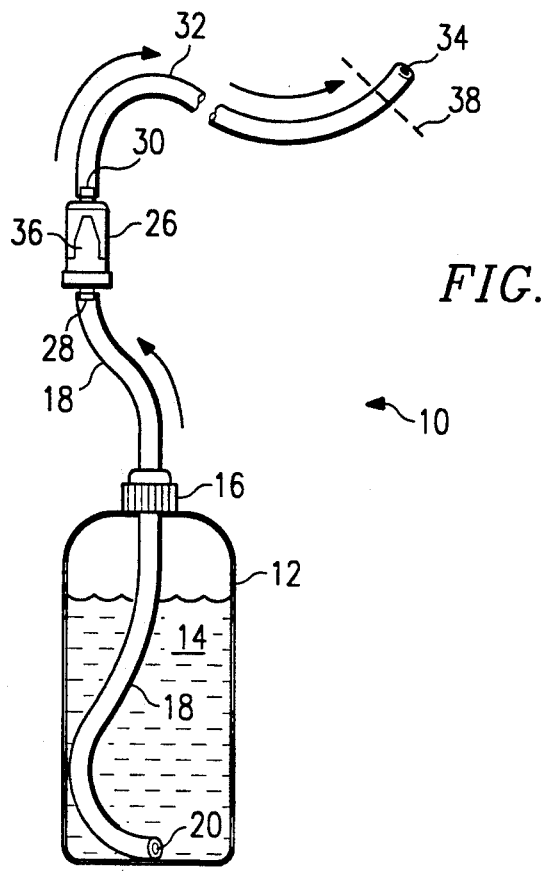
FIG. 1 illustrates a perspective view of the preferred drinking apparatus of the present invention.
Figure 2:
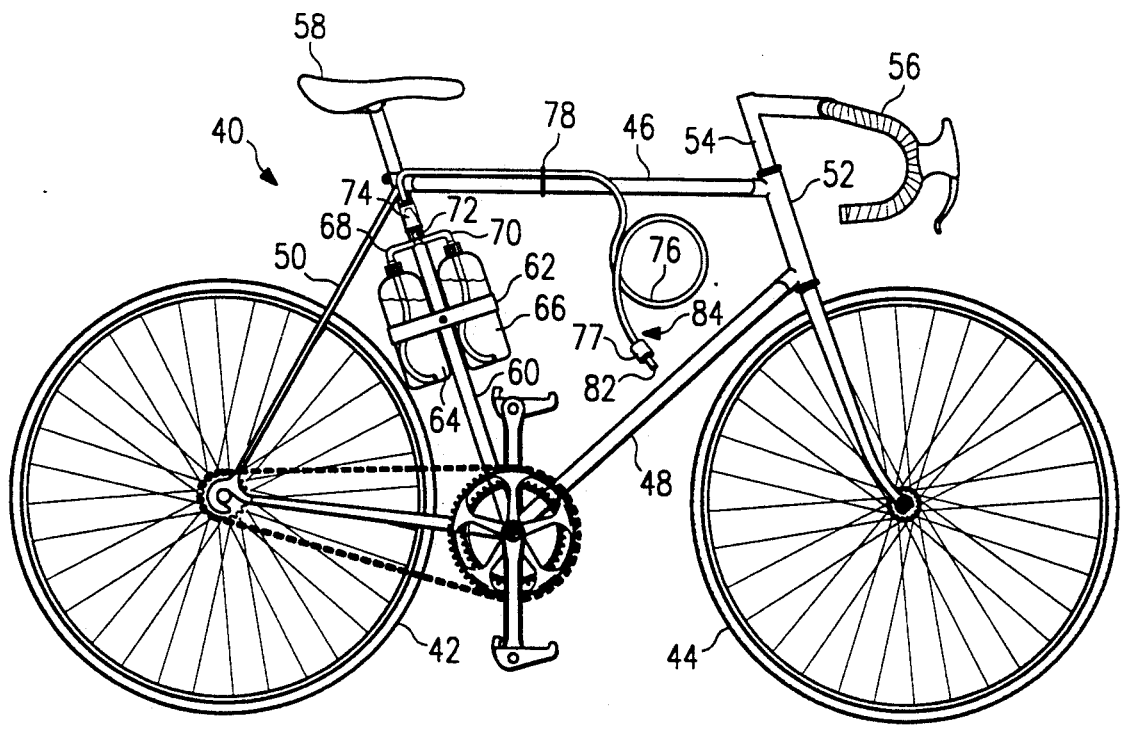
FIG. 2 illustrates a perspective view of an alternative embodiment of the preferred drinking apparatus mounted on a bicycle.

The preferred embodiment of the present invention and its advantages are best understood by referring to FIGS. 1-2 of the drawings, like numerals being used for like and corresponding parts of the various drawings.

FIG. 1 illustrates a perspective view of a drinking apparatus 10 in accordance with the present invention. Apparatus 10 includes a container 12 which, in the preferred embodiment, is a common fluid bottle as is known in the art. Typically, container 12 is constructed of a rigid, transparent or translucent plastic material and, therefore, the fluid 14 stored within container 12 is generally visible to the user of apparatus 10. A lid 16 is removably attached to container 12 in one of many techniques known in the art. For example, lid 16 may be threadably attached to container 12. As a result, a user of apparatus 10 may unscrew lid 16 counterclockwise from container 12 to refill fluid 14 within container 12. Once container 12 is filled with fluid, lid 16 is screwed in a clockwise fashion until it is again secured to container 12.

A flexible tube 18 is disposed within container 12 to provide access to fluid 14. Specifically, tube 18 has an aperture 20 at one end in order to draw fluid 14 upward through tube 18. In the preferred embodiment, tube 18 passes through an aperture vertically disposed through lid 16 so that fluid may be drawn upward and out of bottle 12. In an alternative embodiment, tube 18 may be broken down into two different tubes, one tube being internal to bottle 12 and the other being external to bottle 12. In this alternative embodiment, lid 16 would include an outlet for coupling the interior and exterior tubes replacing tube 12.

Although not shown, bottle 12 preferably also includes some type of inlet air flow device. As known in the art, it is typically necessary to allow air to flow inward to bottle 12 as fluid 14 is withdrawn from bottle 12. The inlet air flow device may simply be a hole near, or in, lid 16. As a more complex structure, a separate poppet valve may be included in bottle 12 for allowing an inlet of air. Still other strategies may be chosen by a person having skill in the art in order to ensure that air may enter bottle 12 as fluid 14 is withdrawn.

A flow control device 26 is connected to a second end of tube 18. Specifically, flow control device 26 includes an inlet 28 over which the second end of tube 18 is disposed. Further, flow device 26 includes an outlet 30. In the preferred embodiment, flow control device 26 is an automatic valve-type device which permits air and fluid to flow one way through the device, but not in the opposite direction. Such a device is commercially available from aquarium shops as it is used in common aquarium pump configurations.

One end of exterior tube 32 is disposed over outlet 30 of flow control device 26. The other end of exterior tube 32 has an aperture 34 which is readily accessible to a user of drinking apparatus 10. As described in greater detail below, a user may drink from apparatus 10 by applying suction at aperture 34 in order to draw fluid 14 upward through tubes 18 and 32.

The use of drinking apparatus 10 is generally as follows. A user of apparatus 10 first disposes a desirable fluid 14 within container 12. Thus, for purposes of typical outdoor exercise, the user may choose to place water within container 12. As stated above, in the preferred embodiment, lid 16 may be removed from container 12 by unscrewing it, and thereafter, pouring fluid 14 within container 12. Next, lid 16 is screwed back on to container 12 to enclose fluid 14 within container 12. Finally, tube 18 is disposed through the aperture within lid 16 such that it rests in the bottom of bottle 12.

With the remainder of the apparatus in place as shown in FIG. 1, a user may drink fluid 14 by applying suction at aperture 34. In particular, by applying suction to aperture 34, fluid 14 is first drawn upward through tube 18. As suction continues, this same fluid continues through a unidirectional limiter 36 disposed within flow control device 26. As a result, as fluid is drawn upward toward unidirectional flow limiter 36, it cannot return downward and back toward container 12. Indeed, it should be appreciated that the inclusion of flow control device 26 prevents downward movement of air within either tube 18 or tube 32. As a result, once liquid has started upward in either tube, it cannot move downward toward bottle 12. Thus, even if an operator discontinues suction, the fluid in either tube will remain at its current level within the respective tube rather than retreating into bottle 12. Moreover, if the operator continues to apply suction, the fluid exits aperture 34 into the operator's mouth. Thereafter, once the operator discontinues any further suction, then provided exterior tube 32 is in a somewhat vertical direction, the fluid remains at a point 38 just short of aperture 34.

Having explained the operation of apparatus 10, it should be noted that flow control device 26, while preferably disposed between tubes 18 and 32, may be placed anywhere between the point of entry of the fluid (i.e., aperture 20) and the point of exit of the fluid (i.e., aperture 34). Thus, flow control device 26 may be disposed within bottle 12, or constructed integrally within lid 16. Still further, second exterior tube 32 could be eliminated entirely, and a user could simply apply suction at outlet 30 to drink from bottle 12.

In view of the above, it should be appreciated that the inclusion of flow control device 26 requires a user of apparatus 10 to apply sufficient suction to aperture 34 only once in order to draw fluid the entire distance from container 12 to aperture 34. After this initial suction is applied, the fluid remains at a point 38 very near aperture 34, rather than returning downwardly through tubes 32 and 18 into container 12. As a result, apparatus 10 provides a significant advantage in that a user may draw the liquid upward in this fashion prior to engaging in any heavy exercise. For example, if apparatus 10 were used in the context of a bicycle race, the cyclist may suck the fluid 14 upward to point 38 prior to commencing the race. Thus, upon beginning the race, each time the user drinks fluid, he or she only applies sufficient suction to draw the fluid upward from its resting point 38 to aperture 34. Accordingly, a minimal amount of suction is necessary on behalf of the user, thereby easing their burden while still providing him or her the ability to drink during the bicycle race.

One other consideration arises from the use of apparatus 10. Particularly, it may be appreciated that, after initial suction, a certain amount of fluid will rest in tube 32. If the outdoor temperature is extreme, the fluid temperature within tube 32 may increase. For some athletes, this is irrelevant because they desire to have access to fluid, irrespective of its warmth. For others, the fluid in container 12 may be cooled or frozen prior to using the apparatus and, hence, any warming effect will be minimized. As yet another alternative, tube 32, as well as tube 18 and even container 12 may be insulated from the ambient temperature. One way of providing this insulation is to select an exterior colored coating which will reflect sunlight. Yet another insulating technique is to provide an insulative wrap around the tubing and/or bottle. Still another alternative is to increase the thickness of the walls of the tubing and/or bottle to minimize the effects of ambient temperature.

FIG. 2 illustrates a perspective view of the preferred drinking apparatus of the present invention mounted on a bicycle 40. Bicycle 40 is constructed according to any of different embodiments known in the cycling art. As a result, bicycle 40 includes a pair of wheels 42 and 44. In addition, bicycle 40 includes a frame having a crossbar 46, a front stabilizer bar 48, a rear stabilizer bar 50 and a steering column 52. Steering column 52 communicates with a steering shaft 54 which is further connected to a handlebar 56. Bicycle 40 further includes a seat 58 which rests upon a vertical stabilizer bar 60. Typically, vertical stabilizer bar 60, rear stabilizer bar 50 and crossbar 46 are all welded together or joined together in order to provide support for seat 58.

In connection with the present invention, bicycle 40 includes a bottle-mounting apparatus 62 mounted to vertical stabilizer bar 60. Bottle-mounting apparatus 62 may comprise a metallic strapping member bolted to vertical stabilizer bar 60. Various alternative mounting apparatus, such as a bottle cage or a flexible strap member, could be used in place of the rigid member illustrated in FIG. 2. In any case, bottle-mounting apparatus 62 supports a pair of bottles 64 and 66 disposed immediately adjacent vertical stabilizer bar 60. Further, different types of bottle-mounting apparatus could be chosen to mount bottles 64 and 66 individually at different locations along the frame of bicycle 40. For example, one bottle may remain affixed to vertical stabilizer bar 60 while another is mounted on front stabilizer bar 48.

Each of bottles 64 and 66 are identical to bottle 12 illustrated in FIG. 1 above and, therefore, include the respective parts described above in connection FIG. 1. In addition, each of bottles 64 and 66 contains a fluid, such as fluid 14 discussed in connection with FIG. 1. Bottles 64 and 66 each communicate with a first exterior tube 68 and 70, respectively. In the preferred embodiment, however, exterior tubes 68 and 70 are joined at their outlet ends through a T-member 72. T-member 72 is constructed in accordance with principles known in the art and provides a device which allows fluid to flow from either branch of the T-member to an outlet. Moreover, the outlet of T-member 72 is directed toward a flow control device 74, which is identical to flow control device 26 discussed in connection with FIG. 1. Accordingly, it should be appreciated that fluid may be drawn from either bottle 64 or 66, either individually or at the same time, through their respective exterior tubes and into flow control device 74.

A single second exterior tube 76 is connected to the outlet of flow control device 74, and is attached via a strapping apparatus 78 to the frame of bicycle 40. Strapping apparatus 78 may be any type of known device for attaching single exterior tube 76 along a bicycle frame. Apparatus 78, however, should be adjusted to prevent any excessive force which could pinch off and close the flow of liquid through exterior tube 76. Thus, strapping apparatus 78 could be a plastic tie or some type of metallic strapping member for holding exterior tube 76 in place.

After passing through strapping apparatus 78, exterior tube 76 is preferably permitted to dangle when not used. When the cyclist mounts bicycle 40, however, an attaching device (not shown) placed at a point 84 near aperture 82 may be used to attach aperture 82 near the cyclist's mouth. In the preferred embodiment, this attaching device is a safety pin-like device which permits an operator of bicycle 40 to physically attach exterior tube 76 to his or her shirt. As an alternative, a hook and loop fastener, such as VELCRO TM, may be used as the attaching device. In either case, tube 76 is attached to the shirt of the operator so that he or she may have access to aperture 82 for drinking by easily bending toward aperture 82, without having to remove his or her hands from handlebar 56. Further, even if the cyclist's hands are moved from handlebar 56, the movement is minimal in comparison to those prior art bicycle water bottle configurations which require the cyclist to reach downward to physically withdraw the bottle from its cage.

As an alternative, tube 76 may be constructed of a less flexible material, and may be mounted near handlebar 56 such that it extends upward toward the cyclist. In this manner, the cyclist need only lean forward toward handlebar 56 to have access to the end of the tube and, hence, to take a drink.

From the above, therefore, it should be appreciated that the present invention provides an improved drinking apparatus for use in any activity wherein a person desires to easily have access to a drink with minimal or no interruption of his or her activities. Although not necessarily limited, the present invention has particular advantage in connection with cycling because the operator is not disturbed from his concentration and balanced position. Further, while the present invention has been described in detail, it should be understood that various substitutions, alterations and modifications may be made to the above-description without departing from the spirit and scope of the invention as defined by the following claims.

What is claimed is:

1. An apparatus for drinking a liquid stored in a bottle, comprising:
    a tube for drawing liquid in a first direction from said bottle toward a point external from said bottle in response to suction at said point; and
    means external from said bottle for communicating with said tube for preventing said liquid from moving in a second direction opposite said first direction, wherein said means permits liquid to move in said first direction in response to said suction.

2. The apparatus for drinking of claim 1 wherein said means for preventing said liquid from moving in said second direction comprises a one-way valve which permits said liquid to flow through said valve with no manual interaction with said valve.

3. The apparatus for drinking of claim 1 wherein said tube comprises a first end for suction by a person to draw liquid in said first direction, and further comprising means for attaching said first end of said tube to a location proximate a person's mouth.

4. The apparatus for drinking of claim 3 wherein said means for attaching comprises a clip member.

5. The apparatus for drinking of claim 3 wherein said means for attaching comprises hook and fastener means.

6. The apparatus for drinking of claim 1 wherein said tube comprises a first tube, and further comprising a second tube having a first end connected to said means for preventing said liquid from moving in a second direction and a second end communicating with said bottle.

7. The apparatus of claim 1 and further comprising means associated with said bottle for permitting air to flow inward to said bottle as said liquid moves in said first direction.

8. The apparatus of claim 7 wherein said means for permitting air to flow inward comprises an aperture formed within said bottle.

9. The apparatus of claim 1 wherein said tube is insulated so that the temperature of said liquid is not substantially affected by ambient temperature external to said tube.

10. An apparatus for drinking a liquid, comprising:
    a container for storing said liquid;
    a tube for drawing said liquid in a first direction from said container toward a point external from said container in response to suction at said point; and
    means external from said bottle for communicating with said tube for preventing said liquid from moving in a second direction opposite said first direction, wherein said means permits liquid to move in said first direction in response to said suction.

11. The apparatus for drinking of claim 10 wherein said means for preventing said liquid from moving in said second direction comprises a one-way valve which permits said liquid to flow through said valve with no manual interaction with said valve.

12. The apparatus for drinking of claim 10 wherein said tube comprises a first end for receiving said suction to draw liquid in said first direction, and further comprising means for attaching said first end of said tube to a location proximate a person's mouth.

13. The apparatus for drinking of claim 10 wherein said tube comprises a first tube, and further comprising a second tube having a first end connected to said means for preventing said fluid from moving in a second direction and a second end communicating with said bottle, wherein said first and second tubes are insulated so that the temperature of said liquid is not substantially affected by ambient temperature external to said first and second tubes.

14. An apparatus for drinking a liquid, comprising:
    a main tube for drawing said liquid in a first direction toward a mouth of a person applying a suction force;
    means external from said bottle for communicating with said main tube for preventing said liquid from moving in a second direction opposite said first direction, wherein said means permits said liquid to move in said first direction in response to said suction force;
    a split member having an outlet communicating with said main tube, and having a plurality of inlets, wherein each of said inlets communicates with a respective bottle tube; and
    a plurality of bottles for storing said liquid, wherein each of said plurality of bottle tubes communicates with a respective one of said plurality of bottles, and such that said suction force applied to said main tube causes said liquid to be drawn from each of said plurality of bottle tubes through said split member and to said main tube.

15. The apparatus for drinking of claim 14 wherein said means for preventing said liquid from moving in said second direction comprises a one-way valve which permits said liquid to flow through said valve with no manual interaction with said valve.

16. The apparatus for drinking of claim 14 wherein said main tube comprises a first end for suction by a person to draw liquid in said first direction, and further comprising means for positioning said first end of said main tube to a location proximate a person's mouth.

17. The apparatus for drinking of claim 16 wherein said plurality of bottles are affixed to a bicycle, and wherein said means for positioning said first end of said tube to a location proximate a person's mouth comprises attaching means for attaching said first end of said tube to a shirt of a rider of said bicycle.

* * * * *

UNITED STATES PATENT AND TRADEMARK OFFICE
CERTIFICATE OF CORRECTION

PATENT NO. : 5,265,769
DATED : November 30, 1993
INVENTOR(S) : Danny G. Wilson

It is certified that error appears in the above-indentified patent and that said Letters Patent is hereby corrected as shown below:

Col. 6, line 36, delete "(not shown)", insert --77--.

Col. 6, line 39, after "attaching device", insert --77--.

Col. 6, line 43, after "attaching device", insert --77--.

Col. 8, line 1, delete "lo", insert --10--.

Signed and Sealed this

Sixteenth Day of August, 1994

Attest:

BRUCE LEHMAN

Attesting Officer

Commissioner of Patents and Trademarks